United States Patent
Makal et al.

(10) Patent No.: US 10,023,738 B2
(45) Date of Patent: Jul. 17, 2018

(54) BIOABSORBABLE POLYMER BLENDS

(71) Applicant: Lubrizol Advanced Materials, Inc., Cleveland, OH (US)

(72) Inventors: Umit G. Makal, Stow, OH (US); Roger W. Day, Solon, OH (US)

(73) Assignee: LUBRIZOL ADVANCED MATERIALS, INC., Cleveland, OH (US)

( * ) Notice: Subject to any disclaimer, the term of this patent is extended or adjusted under 35 U.S.C. 154(b) by 349 days.

(21) Appl. No.: 14/438,730

(22) PCT Filed: Oct. 14, 2013

(86) PCT No.: PCT/US2013/064792
§ 371 (c)(1),
(2) Date: Apr. 27, 2015

(87) PCT Pub. No.: WO2014/070428
PCT Pub. Date: May 8, 2014

(65) Prior Publication Data
US 2015/0291791 A1    Oct. 15, 2015

Related U.S. Application Data

(60) Provisional application No. 61/719,995, filed on Oct. 30, 2012.

(51) Int. Cl.
| | | |
|---|---|---|
| C08L 75/00 | (2006.01) | |
| C08L 75/06 | (2006.01) | |
| C08G 18/66 | (2006.01) | |
| C08G 18/75 | (2006.01) | |
| C08G 18/76 | (2006.01) | |
| C08G 18/32 | (2006.01) | |
| C08G 18/42 | (2006.01) | |
| C08L 67/04 | (2006.01) | |

(52) U.S. Cl.
CPC .......... *C08L 75/06* (2013.01); *C08G 18/3206* (2013.01); *C08G 18/4266* (2013.01); *C08G 18/664* (2013.01); *C08G 18/758* (2013.01); *C08G 18/7657* (2013.01); *C08L 67/04* (2013.01); *C08L 2201/06* (2013.01); *C08L 2203/02* (2013.01); *C08L 2207/04* (2013.01)

(58) Field of Classification Search
None
See application file for complete search history.

(56) References Cited

U.S. PATENT DOCUMENTS

| | | | | |
|---|---|---|---|---|
| 4,661,530 A | * | 4/1987 | Gogolewski | ............ A61L 27/26 521/137 |
| 2010/0260702 A1 | * | 10/2010 | Bezwada | ............... A61K 47/34 424/78.06 |

FOREIGN PATENT DOCUMENTS

| | | |
|---|---|---|
| JP | 2002-37995 A | 2/2006 |
| WO | 84/00302 A1 | 2/1984 |
| WO | 97/34953 A1 | 9/1997 |
| WO | 2011/157691 A1 | 12/2011 |

* cited by examiner

*Primary Examiner* — Ana L Woodward
(74) *Attorney, Agent, or Firm* — Samuel Laferty; Teresan Gilbert

(57) ABSTRACT

The invention provides a bioabsorbable blend of (i) a polymer component comprising polylactic acid (PLA), polyglycolic acid (PGA), a copolymer of PLA and PGA, or any combination thereof and (ii) thermoplastic polyurethane (TPU) tailored to a medical application, and a process for making the same. In some embodiments, the TPU comprises units derived from a diol chain extender, a diisocyanate, and a polyol formulated to provide a set biodegradation rate in combination with at least one physical property. The blend of the invention provides useful materials for medical applications that have the individual benefits of polylactic acid and TPU while moderating each material's typical limitations.

25 Claims, No Drawings

BIOABSORBABLE POLYMER BLENDS

CROSS REFERENCE TO RELATED APPLICATION

This application claims priority from PCT Application Serial No. PCT/US2013/064792 filed on Oct. 14, 2013, which claims the benefit of U.S. Provisional Application No. 61/717,995 filed on Oct. 30, 2012.

FIELD OF THE INVENTION

The invention provides a bioabsorbable blend of polylactic acid and thermoplastic polyurethane tailored to a medical application, and a process for making the same. In some embodiments the thermoplastic polyurethane comprises units derived from a diol chain extender, a diisocyanate, and a polyol formulated to provide a set biodegradation rate in combination with at least one physical property. The blend of the invention provides useful materials for medical applications that have the individual benefits of polylactic acid and thermoplastic polyurethane while moderating each material's typical limitations.

BACKGROUND OF THE INVENTION

There has been an increasing interest in the use of biodegradable and/or bioabsorbable materials, rather than biostable biomaterials, in a number of applications in the biomedical field. The importance of biosafety and long-term stability of polymers used in many implants are major driving forces for this trend. The innovations in biomedical processes, such as tissue engineering, gene therapy, controlled drug release, and regenerative medicine have accelerated the use of biodegradable materials to make devices which help the body to repair and regenerate the damaged tissue so that many post or ex-plantation operations can be avoided. Exemplary of the biomedical applications of biodegradable and/or bioabsorbable materials are implants, such as screws, pins, bone plates, staples, sutures (monofilament and multifilament), drug-delivery vehicles, membranes for guided tissue regeneration, mesh and porous materials for tissue engineering, anti-adhesion barriers, tissue scaffolds, cardiovascular grafts, and wound dressings.

One of the key limitations of current biodegradable and/or bioabsorbable materials for many of the potential applications has been the lack of the proper combination of physical properties such as tensile strength, flexibility, elongation, abrasion resistance, etc. for the application. Many of these materials are brittle and are not sufficiently strong for the intended application and there has been significant research toward improving the physical and mechanical properties of these materials through various means, including varying and modifying the chemical structure and blending of these polymers with other polymers to increase their strength, flexibility, and the like.

Polylactic acid (PLA) and polyglycolic acid (PGA) and copolymers of PLA and PGA in particular have good bioabsorbability and biocompatibility, but their physical properties limit their overall suitability for many applications. PLA can be very brittle and so cannot be widely used in many applications, including medical applications, where materials with more robust physical properties are also required. PGA also has poor physical properties, and so cannot be widely used in many applications, including medical applications, where materials with more robust physical properties are also required. Other materials like PLA and PGA, including copolymers of PGA and PLA, and the like, have similar drawbacks. On the other hand, thermoplastic polyurethanes (TPU) have very good physical properties but often have unacceptable bioabsorbability and biocompatibility. There is a need for materials with the good bioabsorbability and biocompatibility of PLA but also the good physical properties of materials like thermoplastic polyurethanes (TPU). There remains a need for biodegradable and/or bioabsorbable polymers to meet a variety of applications where the desired combination of physical properties and degradation rate can be chosen for the biodegradable and/or bioabsorbable polymer tailored to the specification application for which it will be used. The present invention addresses these ongoing needs.

SUMMARY OF THE INVENTION

The present invention provides biodegradable and/or bioabsorbable polymer blends and processes of making such blends tailored for a medical application. As used throughout the rest of this application, the term "bioabsorbable" will be used as meaning biodegradable and/or bioabsorbable and/or biosorbable and/or bioresorbable.

The present invention provides bioabsorbable polymer blend comprising: (i) an aliphatic thermoplastic polyurethane (TPU) component; and (ii) a polymer component comprising a polylactic acid (PLA), a polyglycolic acid (PGA), a copolymer of PGA and PLA, or any combination thereof (the PLA/PGA component). It has been found that such blends give a surprising combination of properties, especially when the aliphatic TPU component includes a bioabsorbable TPU compound. The described blends combine the bioabsorbability and biocompatibility of PLA/PGA component and the physical properties of TPU, thus overcoming the limitation of each material alone. Also, the ratio of the various components of the blend can be used to vary the degradation rate and the physical properties of the blend to give any of a range of desired values. When a bioabsorbable TPU compound is used, the described blends may also be tailored to a specific combination of physical properties and degradation rate.

The aliphatic TPU component may comprise the reaction product of a polyisocyanate component, a diol chain extender component, and optionally a polyol component. For example, the aliphatic TPU component may comprise the reaction product of a diisocyanate component, a diol chain extender component, and a polyol component; wherein the diisocyanate component comprises 4,4'-methylene diphenyl diisocyanate (HMDI), 1,6-hexane diisocyanate (HDI), 1,4-butane diisocyanate (BDI), L-lysine diisocyanate (LDI), 2,4,4-trimethylhexamethylenediisocyanate, di-cyclohexyl diisocyanate (H12MDI), or any combination thereof; wherein the chain extender component comprises 1,4-butanediol (BDO), 2-ethyl-1,3-hexanediol (EHD), 2,2,4-trimethyl pentane-1,3-diol (TMPD), 1,6-hexanediol (HDO), 1,4-cyclohexane dimethanol (CHDM), 1,3-propanediol (PDO), or any combination thereof; and wherein the polyol component comprises hydroxyl terminated polyethers, hydroxyl terminated polyesters, hydroxyl terminated polycaprolactones, hydroxyl terminated polycarbonates, or any combination thereof. In some embodiments the aliphatic TPU component comprises the reaction product of a diisocyanate component, a diol chain extender component, and a polyol component; wherein the diisocyanate component comprises 4,4'-methylene diphenyl diisocyanate (HMDI), 1,6-hexane diisocyanate (HDI), di-cyclohexyl diisocyanate (H12MDI), or any combination thereof; wherein the chain extender component comprises 1,4-butanediol (BDO), 1,6-hexanediol (HDO), 1,3-propanediol (PDO), or any combination thereof; and wherein the polyol component comprises hydroxyl terminated polyethers, hydroxyl terminated polyesters, hydroxyl terminated polycaprolactones, hydroxyl terminated polycarbonates, or any combination thereof.

The invention further provides the described bioabsorbable polymer blend wherein the aliphatic TPU component comprises a bioabsorbable TPU compound which comprises the reaction product of a (i) polyisocyanate component, (ii) a diol chain extender component, and (iii) optionally a polyol component, wherein at least one of the components (i), (ii), and (iii) contains hydrolyzable units such that the resulting compound contains hydrolyzable units in its backbone.

In some embodiments the degradation rate of the bioabsorbable TPU compound present in the blend is set by adjusting one or more degradation rate parameters and wherein at least one physical property of the bioabsorbable TPU compound is set by adjusting one or more physical property parameters; resulting in bioabsorbable polymer blend comprising a bioabsorbable TPU compound having at least one physical property of the bioabsorbable TPU compound, and the degradation rate of the bioabsorbable TPU compound, independently set.

In some embodiments the polyisocyanate used to prepare the TPU compound comprises an aliphatic diisocyanate; the polyol is selected from the group consisting of polyester polyols, polyether polyols, and combinations and derivatives thereof; and the chain extender is selected from the group consisting of diols, diamines, and combinations thereof. For example the polyisocyanate component may comprise 4,4'-methylene diphenyl diisocyanate (HMDI), 1,6-hexane diisocyanate (HDI), 1,4-butane diisocyanate (BDI), L-lysine diisocyanate (LDI), 2,4,4-trimethylhexamethylenediisocyanate, di-cyclohexyl diisocyanate (H12MDI), or any combination thereof; the polyol component may comprise poly lactic acid (PLA), polyglycolic acid (PGA), polybutylene adipate, polybutylene succinate, poly-1,3-propylene succinate, polycaprolactone, poly(lactide-co-caprolactone), copolymers of two or more thereof, or any combinations thereof; the chain extender component may comprise 1,4-butanediol, 2-ethyl-1,3-hexanediol (EHD), 2,2,4-trimethyl pentane-1,3-diol (TMPD), 1,6-hexanediol, 1,4-cyclohexane dimethanol (CHDM), 1,3-propanediol, and combinations thereof. In some embodiments the bioabsorbable unit of the polyol component is derived from lactic acid, glycolic acid, caprolactone, or a combination thereof.

The invention further provides a process of making a bioabsorbable polymer blend comprising the steps of: (I) mixing (i) an aliphatic thermoplastic polyurethane (TPU) component and (ii) a polymer component comprising a PLA, a PGA, a copolymer of PLA and PGA, or any combination thereof (the PLA/PGA component).

The invention includes a process of making a bioabsorbable polymer blend comprising a PLA/PGA component and a bioabsorbable TPU compound tailored for a medical application, said process comprising the steps of: (I) reacting a polyisocyanate component, a diol chain extender component, and optionally a polyol component, wherein at least one of the components contains hydrolyzable units such that the resulting in said bioabsorbable TPU compound contains hydrolyzable units in its backbone; wherein a degradation rate of the compound is set by adjusting one or more degradation rate parameters and wherein at least one physical property of the compound is set by adjusting one or more physical property parameters, resulting in a bioabsorbable TPU compound having at least one desired physical property of the compound, and a desired degradation rate of the compound, independently set; and (II) mixing (i) an aliphatic TPU component and (ii) a polymer component comprising a PLA, a PGA, a copolymer of PLA and PGA, or any combination thereof.

In some embodiments the hydrolyzable units and enzymatically cleavable units are derived from the chain extender and/or the polyol.

In any of the embodiments of the invention the degradation rate may be expressed as a function of at least one of: a change in molecular weight with time; a change in tensile strength with time; and a change in weight of the polymer with time.

The compositions and processes of the invention provide blends tailored for medical applications, and give the user the ability to independently and continuously adjust both the degradation rate and the physical properties based on an understanding of the way that the TPU physical properties and degradation rates interact with each other, while also giving the ability to use such TPU in blends with a polymer component comprising a PLA, a PGA, a copolymer of PLA and PGA, or any combination thereof. These relationships enable design of blends which can have any combination of physical properties and degradation rate combining the benefits of and removing the drawback of TPU and a PLA/PGA component in medical applications.

DETAILED DESCRIPTION OF THE INVENTION

Various features and embodiments of the invention will be described below by way of non-limiting illustration.

Aspects of the invention relate to a composition including a TPU and a polymer component comprising a PLA, a PGA, a copolymer of PLA and PGA, or any combination thereof, and a process for the preparation of the same.

The PLA useful in the present invention is not overly limited. PLA is a thermoplastic aliphatic polyester that is prepared from renewable resources, such as corn starch, tapioca, or sugarcane. PLA can be very brittle and so generally has limiting physical properties preventing it from being useful in a wide range of applications.

The PGA useful in the present invention is not overly limited. PGA is a thermoplastic aliphatic polyester. PGA can be prepared from non-polymerized glycolic acid via a polycondensation reaction or a ring-opening polymerization.

Copolymers of PLA and PGA, with each other and even with other materials, are useful in the present invention as well. Examples of useful copolymers include poly(lactic-co-glycolic acid), poly(glycolide-co-caprolactone), poly(glycolide-co-trimethylene carbonate), poly(lactic-co-caprolactone), poly(lactic-co-trimethylene carbonate), or any combination thereof.

In some embodiments the aliphatic TPU used in the blends of the invention are not overly limited. Any of the TPU materials described below may be combined with any of the PLA/PGA components described herein to prepare the described blends.

In other embodiments the aliphatic TPU used in the blends of the invention are bioabsorbable TPU compounds.

The PLA/PGA component and the TPU component may be present in the blends of the invention in a weight ratio of 10:90 to 90:10, or even from 20:80 to 80:20, or from 40:60 to 60:40. The lower end of the suitable weight ratio range may be 5:95, 10:90, 20:80, 25:75, 30:70, 40:60, or even 45:55. The upper end of the suitable weight ratio range may be 95:5, 90:10, 80:20, 75:25, 70:30, 60:40, or even 55:45. In some embodiments the blend may be a 50:50 blend of TPU and PLA/PGA component.

The choice of the PLA/PGA component, the choice of the TPU component, and the ratio between the two will each have an impact on the physical properties and degradation rate of the resulting blend. These parameters may be used to select the combination of the properties desired in the resulting blend, along with the parameters discussed further below.

As further detailed below, the blend of the invention may include one or more additional polymeric materials, and may further include one or more additives to further improve the properties and/or performance of the materials. Such additional blend components and/or performance additives are not overly limited and include those known in the field.

The bioabsorbable TPU compounds useful in the invention may be prepared to have physical properties and degradation rates chosen and independently set. The invention allows both the physical and mechanical properties and the biodegradation rates of polymers to be independently modified to precisely match the needs of the application or to fit a particular patient profile. The described bioabsorbable polymers, through minor variations of ratios and/or specific identifies of ingredients used, allow significant differences in bioabsorption rate and physical properties to be achieved independently of one another.

As used herein, a bioabsorbable polymer is a polymer which when placed into the body of a human or animal subject is degraded and/or absorbed by the body, for example, by hydrolyzation and/or enzymatic cleavage. The bioabsorption properties of the polymer are simulated through measurable biodegradation properties. A bioabsorbable polymer thus has one or more biodegradation properties, such as a change in molecular weight with time, a change in tensile strength with time, a change in weight of the polymer with time, or a combination thereof when placed in the body. The biodegradation property can be estimated, for example, through in vitro measurements in conditions which simulate the conditions to which the bioabsorbable polymer is expected to be exposed in the body. The measured change in the biodegradation property, under such test conditions is generally no less than 10% over the course of a year. However, a wide variation in the biodegradation properties of the exemplary polymers is provided in order to enable candidate polymers to be identified which cover a range of the biodegradation property.

The bioabsorbable polymers of the invention include bioabsorbable thermoplastic polyurethane compounds. A TPU is a polyurethane which includes hard segments and soft segments. The hard segments are generally derived from an isocyanate and a chain extender. The soft segments are derived from a polyol. The term "polyurethane" as used herein includes polyureas and compounds with both urethane and urea linkages.

The soft segment provides some or all of the biodegradation properties of the polymer, although in some embodiments, at least some of the degradation properties are influenced and/or provide by the chain extender.

The TPU compound can thus be a multi-block copolymer which is the reaction product of (a) at least one polyol, (b) at least one chain extender, c) at least one diisocyanate, and (d) optionally at least one catalyst, and e) optionally at least one additive, other than the components a), b), c) and d).

Component (a) provides the soft segment of the final TPU material. Suitable polyols include OH-terminated oligomeric glycols, such as polyether polyols, polyester polyols, and mixtures and derivatives thereof. Exemplary polyether polyols include polyethylene glycol (PEG), and poly(trimethylene oxide) glycol (PTMEG). Exemplary polyester polyols include aliphatic polyester polyols, such as copolymers of a cyclic lactone (such as lactide, glycolide, acetolactone, beta-propiolactone, caprolactone, valerolactone, butyrolactone, pivalolactone, or decalactone) and an α-hydroxy acid or ester thereof (such as lactic acid or glycolic acid), and polymer blends thereof. Examples of such polyester polyols include poly(lactide-co-caprolactone), and poly(glycolide-co-caprolactone). Other exemplary polyester polyols include polylactic acid, polyalkylene adipates (such as poly(butylene adipate), poly(ethylene adipate), poly(hexamethylene adipate), poly(tetramethylene-co-hexamethylene adipate)), succinates (such as poly(butylene succinate), poly-(1,3-propylene succinate)), polycarbonate polyols (such a poly(hexamethylene carbonate), poly(pentamethylene carbonate), poly(trimethylene carbonate)), copolymers of two or more thereof, and mixtures thereof. Component (a) can also be the condensation product of a short (e.g., MW (400-1000 Mn)) polyester glycol and an α-hydroxy acid, such as lactic acid, glycolic acid, or a mixture thereof. Component (a) can also be the condensation product of an α-hydroxy acid, an alkylene diacid (such as one or more of adipic acid, succinic acid, sebacic acid, azelaic acid), and an alkylene diol (such as one or more of ethylene glycol, propylene glycol, butanediol, hexanediol). Component (a) can also be an alpha, omega-hydroxy telechelic random copolymer of at least one of a cyclic lactone, a carbonate, and an ester monomer, such as D-lactide, L-lactide, mesolactide, glycolide, dioxanone, trimethyl carbonate, acetolactone, propiolactone, butyrolactone, valerolactone, and caprolactone. One particularly suitable polyol includes poly (lactide-co-caprolactone) or a derivative thereof.

In some embodiments the polyol component may also include a diamine, including any of the diamines described herein, as well as any similarly active-hydrogen compounds that are reactive with isocyanate groups. The hydroxyl groups of the polyols described above being one of the most suitable examples.

The mole ratio of cyclic lactone (e.g., caprolactone) to α-hydroxy acid (e.g., lactic acid) in the copolymer can be about 95:5 to about 30:70, such as from 45:55 to 30:70 or from about 95:5 to about 5:95.

The polyester/polyether polyols can be random, block, segmented, tapered blocks, graft, tri-block, etc., having a linear, branched, or star structure.

The weight average molecular weight of component (a) (polyol) within the exemplary polymer can be up to 20,000, and in one embodiment, up to 10,000, such as in the range of 500-5000. A glass transition temperature of component a) can be lower than ambient temperature (e.g., lower than 25° C.) and in one embodiment, lower than 0°, or lower than −15° C.

The chemical composition of component (a) can be chosen so that it is sufficiently different in polarity, has the ability to hydrogen-bond, and other such properties known to those skilled in the art so that it will effectively phase separate from the hard segment of the multi-block copolymer that is formed on reaction of the various components. Lack of phase separation can result in the properties of the final product being compromised, although for some applications, such lack of phase separation may be acceptable or even useful.

Component (b) is generally a low molecular weight diol or diamine chain extender. Suitable chain extenders include diols, diamines, and combinations thereof. Exemplary chain extenders include alkane diols of from 1-30 carbon atoms, ethylene glycol, 1,3-propanediol, 1,2-propanediol, 1,4-butanediol, hexamethylenediol, heptanediol, pentanediol, hexamethylenediol, heptanediol, nonanediol, dodecanediol, 2-ethyl-1,3-hexanediol (EHD), 2,2,4-trimethyl pentane-1,3-diol (TMPD), 1,6-hexanediol, 1,4-cyclohexane dimethanol (CHDM), diethylene glycol, dipropylene glycol, and combinations thereof. Suitable diamine chain extenders can be aliphatic or aromatic in nature, such as alkylenediamines of from 1-30 carbon atoms (e.g., ethylenediamine, butanediamine, hexamethylenediamine). Component (b) can also be synthesized by condensation of an alpha-hydroxy acid, such as lactic acid, glycolic acid, or a mixture thereof, with a small alkanediol and/or hydroxyl amine molecule of from 1-20 carbon atoms, such as ethylene glycol, butanediol, hexamethylenediol, ethanolamine, aminobutanol, or a mixture thereof. Component (b) can also be synthesized by condensation of an alpha-amino acid such as glycine, lysine or similar amino acids with a small alkylene diol molecule of from 1-20 carbon atoms such as ethylene glycol, butane diol, hexamethylene diol or a mixture of thereof.

The chain extender can have a number-average molecular weight Mn of up to 2000 and in some embodiments, up to 1000, such as for example, 100 to 700.

Component (c) can be a diisocyanate. Suitable isocyanates include aliphatic diisocyanates, such as 4,4'-methylene dicylcohexyl diisocyanate (HMDI), 1,6-hexane diisocyanate (HDI), 1,4-butane diisocyanate (BDI), L-lysine diisocyanate (LDI), 2,4,4-trimethylhexamethylenediisocyanate, other similar diisocyanate, and mixtures thereof. Other diisocyanates which can be used include aromatic diisocyanates such as toluene diisocyanate (TDI), 2,4'-methylenediphenyl diisocyanate, and 4,4'-methylenediphenyl diisocyanate, and mixtures thereof.

Component (c) can be used in an approximately stoichiometrically equivalent amount to the total amount of hydroxyls and amine groups (where present) in the formulation (i.e., in components a) and b)) such that the number of moles of isocyanate groups is equal to the number of moles of hydroxyl and amine groups. This favors high molecular weight (MW) TPUs with material properties suited to many biomedical applications. By adjusting this ratio slightly, the molecular weight of the TPU can be controlled to within a desired range. In one embodiment, a molar ratio of isocyanate groups to hydroxyl plus amine groups is in a range of 0.8-1.2. Alternatively or additionally, a monofunctional alcohol, amine, or isocyanate molecule can be utilized in combination with the diisocyanate for controlling the final TPU MW.

Component (d) can be any suitable urethane polymerization catalyst. Some specific examples include metal alkyls, chlorides, esters, and carboxylates, and mixture thereof. Amines, such as trimethylamine, triethylamine, triethylenediamine, N-methylmorpholine, N-ethylmorpholine, dimethylcyclohexylamine, N,N'-dimethylpiperazine, dimethylaniline, N,N,N'N'-tetramethylethylenediamine, 1,8-diazobicylo[5,4,0]undec-7-ene, and tri(dimethylaminomethyl)phenol, can also be used as catalysts. In some cases, a catalyst is not needed. For example, it can be dispensed with when the polymerization kinetics are sufficiently fast to produce a high MW TPU in a reasonable amount of time. A weight ratio of catalyst (d) to components (a)+(b)+(c) can be from 0:1 to 0.1:1, e.g., at least 0.0001:1.

Component (e) is also an optional ingredient and can include one or more performance additives such as process aids, antioxidants, UV-stabilizers, light stabilizers, lubricants, mineral and/or inert fillers, colorants, opacifying pigments, and mixtures thereof. A weight ratio of component (e) to components (a)+(b)+(c)+(d) can be from 0:1 to 10:1, e.g., 0.001:1 to 1:1.

The hard segment content (% HS) of the copolymer (i.e., the combined content of the components derived from the chain extender and isocyanate, expressed by weight percentage) can range from 2-100 wt. %, 2-95 wt %, and in one embodiment, is at least 5 wt. % or at least 10 wt. %, for at least one of the polymers forming the set of the bioabsorbable polymers. In one embodiment, the set of polymers includes at least one polymer in each of two or more, or at least three, or at least four non-overlapping ranges, such as selected from the following ranges: i) up 10% HS; ii) 10-15% HS, iii) 15-20% HS, iv) 20-30% HS; v) 30-40% HS; vi) 40-50% HS; vii) 50-60% HS; viii) 60-70% HS; ix) >70% HS, and even x) 100% HS (where the hard segment is based on amino acid based chain extenders, and no soft segment derived from a polyol is present in the TPU).

The soft segment content (% SS) of the copolymer (i.e., the percentage by weight of the components derived from the polyol) can range from 5-95%, and in one embodiment, is at least 25% or at least 40%, for at least one of the polymers forming the set of the bioabsorbable polymers. In one embodiment, the set of polymers includes at least one polymer in each of two or more, or at least three, or at least four non-overlapping ranges, such as selected from the following ranges: i) up 20% SS; ii) 20-30% SS; iii) 30-40% SS; iv) 40-50% SS; v) 50-60% SS; vi) 60-70% SS; vii) 70-80% SS; viii) 80-90% SS; and ix) >90% SS.

The soft segment content can be determined by subtracting the hard segment content from 100%.

The bioabsorbable polymers include at least one bioabsorbable unit. A bioabsorbable unit is one which undergoes hydrolysis and/or enzymatic cleavage under conditions similar to those which the polymer is expected to be exposed in the body. In general, the polyol includes at least one bioabsorbable unit. In one embodiment, the bioabsorbable unit is derived from an α-hydroxy acid, such as poly lactic acid (PLA) in the soft segment. In other embodiments, at least some of the bioabsorbable units are in the hard segment, e.g., derived from the chain extender.

The bioabsorbable unit content (e.g., α-hydroxy acid content) of the soft segment of the copolymer, expressed as a percentage by weight % (% PLA) can range from 2-70 wt. %. In one embodiment, the set of polymers includes at least one polymer in each of two or more, or at least three, or at least four non-overlapping ranges, such as selected from the following ranges: i) up 5% PLA; ii) 5-10% PLA; iii) 10-15% PLA; iv) 15-20% PLA; v) 20-30% PLA; vi) 30-40% PLA; vii) 40-50% PLA; viii) 50-60% PLA; >60% PLA.

The exemplary polymers are useful for a wide variety of biomedical applications. The polymers can be readily tailored to provide selected biodegradation properties and physical and mechanical properties that are suited for a specific application/patient.

As will be appreciated, the steps of the method need not all proceed in the order illustrated and can be fewer, more, or different steps.

Physical Property

The physical property described above can be selected from a finite set of physical properties. By way of example, the selectable physical properties may include one or more of the following: tensile strength, hardness, stiffness (flexibility), resilience, abrasion resistance, impact resistance, coefficient of friction (on the surface of the TPU), creep, modulus of elasticity, thermal transition points ($T_g$, $T_m$), water absorption, moisture permeability, contact angle, electrostatic properties such as surface and volume resistivity and conductivity, and combinations thereof. A few of the more important physical properties are further commented on below.

Tensile strength can be determined according to ASTM D638-10. In some embodiments the blend and/or the TPU compound have a result in the range of 5 to 80 or 35 to 70 MPa. In some embodiments the properties used as a degradation property where a desired change is a change of at least 5, 10, or even 20 MPa, or a change of at least 10%, 20%, or 30%.

Hardness can be determined according to ASTM D2240-05. In some embodiments the blend and/or the TPU compound have a result in the range of 60 Shore A to 85 Shore D, 65-95 Shore A or even 65-75 Shore A. In some embodiments the properties used as a degradation property where a desired change is a change of at least 5, 10, or even 20 Shore A, or a change of at least 10% or 20%.

Stiffness (flexibility) can be determined according to ASTM D790-10. In some embodiments the blend and/or the TPU compound have a result in the range of 5 to 15000 MPa. In some embodiments the properties used as a degradation property where a desired change is a change of at least 5, 20, or even 1000 MPa, or a change of at least 10%, 20%, or even 30%.

Resilience (rebound) can be determined according to ASTM D2632-01. In some embodiments the blend and/or the TPU compound have a result in the range of 1 to 95%, or 30 to 80%. In some embodiments the properties used as a degradation property where a desired change is a change of at least 5%, 10%, or 20%.

Physical Property Parameter

Following are examples of the physical property parameters which are modifiable to reduce a difference between the desired physical property and the measured physical property of the bioabsorbable TPU compound (and so the described blend), and suitable methods which can be used to measure them.

The first parameter can be selected from a predefined set of first parameters. These can include one or more of hard segment content of the TPU, molecular weight of the TPU, stoichiometry of the TPU; a molecular weight of a polyol-derived component of the TPU, a hydrophilicity of the overall component and/or the hydrophilicity of a polyol-derived component of the TPU, a difference in polarity between the soft segments and the hard segments, a difference in the degree of hydrogen bonding between the soft segments and hard segments, a molecular weight of the soft segment, a polarity of the soft segments, a crystallinity of the overall compound and/or the crystallinity of the soft segments, and combinations thereof.

These can be determined as follows:

Hard segment content of the TPU: % HS, as described above. This can be adjusted by changing a ratio of polyol to chain extender.

Molecular weight of the TPU: this can be the weight average molecular weight $M_w$ or the number average molecular weight $M_n$.

Stoichiometry of the TPU. This can be described in terms of a molar ratio of the polyol derived component to the chain extender derived component in the formulation and/or by a molar ratio of isocyanate to hydroxyl groups in the formulation.

Molecular weight of a polyol-derived component of the TPU: this value may be determined by GPC, according to ASTM F1635-11, or by hydroxyl number determination. Exemplary polymers may have a molecular weight of 80-250 KDa, e.g., 100-200 KDa.

A hydrophilicity of the overall compound and/or the hydrophilicity of a polyol-derived component of the TPU. This can be estimated by measuring the contact angle of water with the polymer surface or by water swell.

For example, when the physical property includes tensile strength, the first parameter can include molecular weight of the TPU and optionally also hard segment content. As another example, when the physical property includes hardness, the first parameter can include hard segment content. As another example, when the physical property includes stiffness, the first parameter can include the hard segment content % HS and the optionally hydrophilicity of the polyol-derived component of the TPU.

In addition, the choice of the PLA/PGA component, the choice of the TPU component, and the ratio between the two will each have an impact on the physical properties of the resulting blend. These parameters may be used to select the combination of the properties desired in the resulting blend, along with the parameters discussed herein.

Degradation Rate Parameter

The degradation rates of the exemplary TPUs (and so the described blends) depend on a number of factors, which may be referred to as the degradation rate parameter. First is the number of hydrolysable units in the TPU's backbone. Generally the higher the number of hydrolysable units in the polymer's backbone, the more rapid is the degradation rate, everything else being equal. This, however, is not the only factor that impacts degradation rate. The hydrophilicity of the TPU is also a significant contributor to the degradation rate. For a polymer to hydrolyze, it must come into contact with water and if a polymer is very hydrophobic, the rate of degradation will be significantly lower for a given percentage of hydrolysable polymer backbone units when compared with a polymer that is more hydrophilic. This tends to be related to the HS % since the HS is significantly more hydrophobic than the soft segment and also sometimes is crystalline which makes permeation of water into the TPU less facile.

Another factor that impacts the degradation rate is the degree of crystallinity of the polymer. Since the exemplary materials are primarily for use in the body are based on aliphatic isocyanates and this type of TPU does not have crystalline hard segments like aromatic TPUs, the main contributor to crystallinity is the soft segment crystallinity. As the lactic acid content increases, the concentration of hydrolytically labile ester groups increases. Formulations based on amorphous poly(lactide-co-caprolactone) polyols with higher number of ester linkages for a given hard segment content therefore are expected to degrade faster. Lower lactic acid content based formulations are expected to degrade slower due to crystalline (more hydrophobic) nature and lower number of ester linkages.

Phase mixing, which is related to a number of factors including polyol molecular weight and overall TPU Mw, can also affect the rate of degradation. As the more hydrophobic hard phases are more phase-mixed into the hydrolysable soft segments, the overall hydrophobicity of the soft phase will increase and the degradation rate will, as a result, decrease.

In the exemplary embodiment therefore, the degradation rate parameter, can include one or more of a finite set of parameters, such as one or more of a parameter based on a quantity of bioabsorbable units in a backbone structure of the TPU compound, the hydrophilicity of the overall compound and/or the hydrophilicity of the polyol-derived component of the TPU compound, a molecular weight of the polyol-derived component, and combinations thereof.

The parameter based on a quantity (e.g., number average, molar ratio, or the like) of bioabsorbable units in a backbone structure of the TPU compound: this can include one or both of a quantity of hydrolysable units and a quantity of enzymatically cleavable units. This can be the % PLA in the polyol which may also contain other units which are less liable to hydrolyze, as described above, i.e., the bioabsorbable units in the soft segment. However, other components that contribute segments to the backbone of the bioabsorbable polymer, including the chain extender, may also include bioabsorbable units and may be included in the overall quantity of bioabsorbable units.

It will be noted that some of the degradation rate parameters described above are also physical property parameters. In some embodiments the invention includes the proviso that the one or more degradation rate parameters used is in the process are each different from the one or more physical property parameters used in the process and in some cases more than one parameter must be adjusted to maintain the degradation rate while adjusting one or more physical properties to the desired level, while in other cases more than one parameter must be adjusted to maintain one or more physical properties, while adjusting the degradation rate to the desired level.

In addition, the choice of the PLA/PGA component, the choice of the TPU component, and the ratio between the two will each have an impact on degradation properties, i.e. the degradation rate, of the resulting blend. These parameters may be used to select the combination of the properties desired in the resulting blend, along with the parameters discussed herein.

Degradation Rate

The degradation property (which may be referred to as the degradation rate) can be expressed as a function of at least one of: a change in molecular weight of the polymer with time, a change in tensile strength of the polymer with time, a change in impact resistance of the polymer with time, and a change in weight of the polymer with time. These values can be determined in vitro, in a suitable test environment, such as a liquid, with properties of the TPU being measured at intervals, such as days, weeks, or months. In the exemplary embodiment, these degradation properties are measured according to ASTM 1635-11.

The change in tensile strength (or impact resistance) can be expressed as a percentage of the initial value, where the initial and subsequent values are measured according to ASTM 1635-11, as described above. In some embodiments the present invention may allow a base thermoplastic polyurethane to be modified such that its initial tensile strength is adjusted by at least 20%, or at least 40%, or at least 60% upward, and in other embodiments by at least 20%, or at least 40%, or at least 60% downward. In still other embodiments the adjustment may be to the tensile strength as measured 8 weeks after being inserted into the environment where the material is expected/desired to degrade (I.e. a patient's body), where the same adjustments are possible.

Weight loss: The change in weight can be measured according to ASTM 1635-11, expressed as a percentage of the initial value. The set of polymers contemplated by the invention may include polymers which are adjusted in their % change in weight over eight weeks by at least 20%, or at least 40%, or at least 60%.

Molecular Weight loss: The change in molecular weight can be measured according to ASTM 1635-11, expressed as in KDa. The set of polymers contemplated by the invention may include polymers which are adjusted in their % change in molecular weight over eight weeks by at least 20%, or at least 40%, or at least 60%.

The degradation property can be computed, based on these measurements, and can be expressed as, for example, a loss in the property over a specified time interval, either from the start of the immersion, or starting at a specified time thereafter. The degradation property can be expressed in other ways, such as, for example, the time to reach a specified loss in the property such as a specified weight loss or specified percentage change in weight (e.g., a 50% weight loss), or the like.

The properties of useful TPU compounds tend to be highly dependent on the polymer's molecular weight (Mw), hard segment content (HS %), polyol chemical identity and the degree of phase separation (PS) of the TPU. The design of the polymer typically takes place by adjusting the factors (HS %, Mw, PS, polyol chemical identity, etc.) to achieve a TPU (and so a final blend) which is expected to have the approximate properties required. In order for a polymer to have a certain HS %, the ratio of polyol to chain extender can be adjusted. This would be a primary factor controlling the stiffness (flex modulus) of the polymer. The Mw of the polymer can be controlled by varying the stoichiometry (ratio of isocyanate to hydroxyl groups) or by the addition of a monofunctional hydroxyl containing component. This is a significant factor that controls the tensile strength of the polymer although hardness (HS %), phase separation and various other parameters have an effect on this as well but their effect is of a lesser extent. There are other parameters that impact the properties, which include the chemical identity and molecular weight of the polyol used to for the TPU. The chemical identity determines the hydrophilicity/hydrophobicity balance of the TPU formed (which affects water absorption and moisture permeability of the material) and some of the thermal properties of the polymer along with various other properties such as toughness and abrasion resistance. The balancing of each of these requirements for a given application can often only be an approximation, is there are numerous tradeoffs as one property is maximized others are lowered (see Table 1 below).

TABLE 1

| Physical Property | Increase HS % | Increase TPU Mw | Increase Polyol mol. wt. | Increase polyol hydrophilicity |
|---|---|---|---|---|
| Tensile strength | Increases | Increases | Variable* | Typically decreases |
| Hardness | Increases | No effect | Variable* | No effect |
| Hydrophobicity | Variable* | Increases | Variable* | Decreases |
| Abrasion resistance | Increases | Increases | Increases | Typically decreases |
| Flexibility | Decreases | No effect | Slightly decreases | Increases |
| Resilience | Decreases | Increases | Increases | Decreases |

*Varies depending on the morphology (crystalline vs. amorphous) of the polyol and/or the chemical nature (polarity) of the polyol, and/or on the overall balance of effects caused by the change.

The balancing of each of the parameters which impact degradation to give a TPU with a desired degradation rate is also an approximation, since there are numerous tradeoffs in that many of these parameters affect the degradation rate in opposite directions (see Table 2 below).

TABLE 2

| Degradation Rate Parameter | Degradation rate |
| --- | --- |
| Increase Polyol hydrophilicity | Increases |
| Increase polyol mol. Wt. | Increases |
| Increase TPU Mw | Decreases |
| Increase HS % | Decreases |
| Increased Crystallinity | Decreases |
| Decrease number of hydrolysable units in polyol backbone | Decreases |

The design of a bioabsorbable TPU compound, (and so the resulting blend as well), with a specified degradation rate and set of physical properties can thus involve an iterative process whereby the major controllable parameters which affect the physical properties, such as HS %, Mw, polyol molecular weight and chemical identity, stoichiometry, etc. are selected along with the parameters which affect the degradation rate such as number of hydrolysable units in the backbone and the hydrophilicity of the polyol and the polyol molecular weight are chosen. Some parameters, such as hard segment content, may affect both the degradation rate and one or more physical properties of the bioabsorbable TPU, and so in some embodiments a second, or even a third parameter is also adjusted along with the first, in order to arrive at a TPU with the desired combination of properties, that is the desired degradation rate and one or more physical properties.

This initial set of parameters is used to prepare a base TPU which and the properties and degradation rate of this material are measured. Based on the results of these initial measurements, a number of additional TPUs are produced, by varying the parameters in such a way that is designed to produce a material that more closely matches the requirements of the application. For example, to produce a material that has the same physical properties as the initial TPU but with a faster degradation rate, then the next set of materials could be prepared using a polyol that has a higher number of hydrolysable units in its backbone or which has a higher hydrophilic character compared to the first polymer.

As an example, when the desired degradation rate of the TPU compounds (and so the resulting blend as well) is higher (or respectively, lower) than that of the base TPU compound, the adjustment by the modification component can include at least one of: (a) increasing (or decreasing) a number of bioabsorbable units in a backbone structure of the base TPU compound per unit length of the backbone; (b) increasing (or decreasing) a hydrophilicity of a polyol-derived component of the TPU compound; (c) increasing (or decreasing) a molecular weight of the polyol-derived component; (d) decreasing (or increasing) a molecular weight of the TPU compound; (e) decreasing (or increasing) a hard segment content of the TPU compound; and (f) decreasing (or increasing) a crystallinity of the TPU compound.

As another example, when the desired physical property of the TPU compound (and so the resulting blend as well) includes a tensile strength property, and the base TPU compound has a lower (or respectively, higher) tensile strength than the desired tensile strength, the computing of the at least one TPU compound includes at least one of: (a) increasing (or decreasing) a hard segment content of the base TPU compound by altering a ratio of a polyol to a chain extender in the formulation; (b) increasing (or decreasing) a molecular weight of the base TPU compound by varying a stoichiometric ratio of isocyanate to an amount of hydroxyl groups in the TPU compound; (c) increasing (or decreasing) the crystallinity of a polyol-derived component; and (d) increasing (or decreasing) a difference in polarity between hard segment components (isocyanate and chain extender) and soft segment components (polyol) of the TPU compound.

The blends described herein may also include one or more other polymers. The polymers with which the biodegradable and/or bioabsorbable polymers described herein may be blended are not overly limited. In some embodiments the compositions of the invention include two or more of the described biodegradable and/or bioabsorbable polymers in addition to the PLA/PGA component. In some embodiments the compositions of the invention include at least one of the described biodegradable and/or bioabsorbable polymers, the PLA/PGA component, and at least one other polymer.

Suitable polymers include more conventional TPU materials such as polyester-based TPU, polyether-based TPU, TPU containing both polyester and polyether groups, polycarbonate, polyolefin, styrenic polymer, acrylic polymer, polyoxymethylene polymer, polyamide, polyphenylene oxide, polyphenylene sulfide, polyvinylchloride, chlorinated polyvinylchloride, or combinations thereof.

Additional polymers for use in the blends described herein include homopolymers and copolymers. Suitable examples include:

(i) a polyolefin (PO), such as polyethylene (PE), polypropylene (PP), polybutene, ethylene propylene rubber (EPR), polyoxyethylene (POE), cyclic olefin copolymer (COC), or combinations thereof;

(ii) a styrenic, such as polystyrene (PS), acrylonitrile butadiene styrene (ABS), styrene acrylonitrile (SAN), styrene butadiene rubber (SBR or HIPS), polyalphamethylstyrene, styrene maleic anhydride (SMA), styrene-butadiene copolymer (SBC) (such as styrene-butadiene-styrene copolymer (SBS) and styrene-ethylene/butadiene-styrene copolymer (SEBS)), styrene-ethylene/propylene-styrene copolymer (SEPS), styrene butadiene latex (SBL), SAN modified with ethylene propylene diene monomer (EPDM) and/or acrylic elastomers (for example, PS-SBR copolymers), or combinations thereof;

(iii) a thermoplastic polyurethane (TPU) other than those described above;

(iv) a polyamide, such as Nylon™, including polyamide 6,6 (PA66), polyamide 1,1 (PA11), polyamide 1,2 (PA12), a copolyamide (COPA), or combinations thereof;

(v) an acrylic polymer, such as poly(methyl acrylate), poly(methyl methacrylate), a methyl methacrylate styrene (MS) copolymer, or combinations thereof;

(vi) a polyvinylchloride (PVC), a chlorinated polyvinylchloride (CPVC), or combinations thereof;

(vii) a polyoxymethylene, such as polyacetal;

(viii) a polyester, such as polyethylene terephthalate (PET), polybutylene terephthalate (PBT), copolyesters and/or polyester elastomers (COPE) including polyether-ester block copolymers such as glycol modified polyethylene terephthalate (PETG), or combinations thereof;

(ix) a polycarbonate (PC), a polyphenylene sulfide (PPS), a polyphenylene oxide (PPO), or combinations thereof;

or combinations thereof.

It is of course understood that some of the polymer above are better suited for use in biomedical applications, and there may be some applications where one or more of the polymers listed above would not be suitable for use in the described blends of one or more of the biodegradable and/or bioabsorbable polymers described herein and one or more additional polymeric materials. In some embodiments these blends include one or more additional polymeric materials selected from groups (i), (iii), (vii), (viii), or some combination thereof. In some embodiments these blends include one or more additional polymeric materials selected from group (i). In some embodiments these blends include one or more additional polymeric materials selected from group (iii). In some embodiments these blends include one or more additional polymeric materials selected from group (vii). In some embodiments these blends include one or more additional polymeric materials selected from group (viii).

EXAMPLES

The invention will be further illustrated by the following examples. While the examples are provided to illustrate the invention, they are not intended to limit it.

Poly(lactide-co-caprolactone) polyols with varying monomer ratios are converted to TPU using 4,4'-methylene dicyclohexyl diisocyanate-1,4-butanediol as the hard segment at 30-60 wt. % concentrations. The poly(lactide-co-caprolactone) polyols include materials such as Perstorp's Capa™ 600422, consisting of a 2 k molecular weight polyol with a molar ratio of 88 caprolactone:12 lactide. These TPU are then mixed with PLA to result in examples of the described blends.

Biodegradable copolymers poly(lactide-co-caprolactone) polyols (Mn~2000) composed of caprolactone and lactic acid units at varying ratios are used. These are random polymers, as verified by NMR. Poly(lactide-co-caprolactone) polyols with 12.5 and 25.0% lactide are crystalline and those with 30.0 and 50.0% lactide contents are amorphous. HMDI, butanediol, and an aliphatic diisocyanate (Desmodur W) are used as well. Cotin 430 is employed as the reaction catalyst at 100 ppm.

The TPU's are synthesized using typical aliphatic TPU lab polymerization procedures as follows: The polyols are first liquefied in an oven, thoroughly melted and vigorously shaken, prior to blending. Blends are prepared by premixing the ingredients (polyol(s) and chain extender(s)) in an appropriately sized glass jar or by weighing the ingredients directly into a reactor can. If premixing is used, then all blend ingredients are weighed into a glass jar, the lid tightened, and the contents vigorously shaken to homogenize the blend. The required amount of polyol blend is poured into the reactor tin can (the reaction can). If weighing directly into a reactor can is preferred, then all blend ingredients are weighed into appropriately sized reactor cans (a quart size tin can for 400-gram). The blend is placed in the oven to equilibrate at the desired reaction temperature. The curing pans (Teflon® coated) are preheated to the desired aging temperature. The amount of aliphatic diisocyanate (Desmodur W™) plus an estimated amount of drain residue is weighed into an appropriately sized can, and is placed in the oven to equilibrate at the temperature required.

As soon as the starting temperature(s) are reached, the reactor can is removed from the oven(s) and place in the fume hood. A firmly mounted, air driven agitator is positioned approximately ¼ inch from the bottom of the reactor can. With slow stirring to avoid splashing, the appropriate amount of diisocyanate is rapidly poured into the reaction can containing the polyol blend. A short time is allowed for the diisocyanate to drain out of the can. The catalyst is added and the start temperature is recorded. The exotherm temperature is monitored every 30 to 60 seconds. Before the final product begins to set up, the preheated Teflon® coated pan is taken from the oven, the mixer is stopped, and the reaction product is poured into the preheated pans.

Each reaction product is then mixed with preheated PLA and mixed. A commercially available PLA is used (IN-GEO™ 3051D from RESINEX). A series of blends are made with the following weight ratios for each of the TPU compound reaction products (PLA:TPU): 0:100; 20:80; 50:50; 80:20; 100:0.

The temperatures of the resulting blends are monitored every 30 to 60 seconds until product began to set up or gel. The blends are then placed in the oven at 125° C. for 5 hours. After the blend has cured, the covered pans are removed from the oven and placed in a fume hood to cool.

Each of the blends is tested to evaluate its bioabsorbability and biocompatibility, as well as its physical properties, specifically by testing each blends biodegradation rate, percent elongation, and tensile strength. The blends of the invention can provide a better balance of bioabsorbability and biocompatibility, as well as physical properties compared to either PLA or TPU alone.

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil, which may be customarily present in the commercial material, unless otherwise indicated. It is to be understood that the upper and lower amount, range, and ratio limits set forth herein may be independently combined. Similarly, the ranges and amounts for each element of the invention may be used together with ranges or amounts for any of the other elements. As used herein, the expression "consisting essentially of" permits the inclusion of substances that do not materially affect the basic and novel characteristics of the composition under consideration. As used herein any member of a genus (or list) may be excluded from the claims.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A bioabsorbable polymer blend comprising: (i) an aliphatic thermoplastic polyurethane (TPU) component; and (ii) a polymer component comprising polyglycolic acid (PGA), a copolymer of polylactic acid (PLA) and PGA, or any combination thereof.

2. The bioabsorbable polymer blend of claim 1 wherein the aliphatic TPU component comprises the reaction product of a polyisocyanate component, a diol chain extender component, and optionally a polyol component;
   wherein said diol chain extender component comprises a diol chain extender containing from 1 to 20 carbon atoms; and
   wherein the weight average molecular weight of said polyol component within said reaction product is from 500 to 20,000.

3. The bioabsorbable polymer blend of claim 2 wherein the aliphatic TPU component comprises the reaction product of a diisocyanate component, a diol chain extender component, and a polyol component;

wherein the diisocyanate component comprises 1,6-hexane diisocyanate (HDI), 1,4-butane diisocyanate (BDI), L-lysine diisocyanate (LDI), 2,4,4-trimethylhexamethylenediisocyanate, di-cyclohexyl diisocyanate (H12MDI), or any combination thereof;

wherein the chain extender component comprises 1,4-butanediol (BDO), 2-ethyl-1,3-hexanediol (EHD), 2,2,4-trimethyl pentane-1,3-diol (TMPD), 1,6-hexanediol (HDO), 1,4-cyclohexane dimethanol (CHDM), 1,3-propanediol (PDO), or any combination thereof; and wherein the polyol component comprises hydroxyl terminated polyethers, hydroxyl terminated polyesters, hydroxyl terminated polycaprolactones, hydroxyl terminated polycarbonates, or any combination thereof.

4. The bioabsorbable polymer blend of claim 2 wherein the aliphatic TPU component comprises the reaction product of a diisocyanate component, a diol chain extender component, and a polyol component;

wherein the diisocyanate component comprises 1,6-hexane diisocyanate (HDI), di-cyclohexyl diisocyanate (H12MDI), or any combination thereof;

wherein the chain extender component comprises 1,4-butanediol (BDO), 1,6-hexanediol (HDO), 1,3-propanediol (PDO), or any combination thereof; and wherein the polyol component comprises hydroxyl terminated polyethers, hydroxyl terminated polyesters, hydroxyl terminated polycaprolactones, hydroxyl terminated polycarbonates, or any combination thereof.

5. The bioabsorbable polymer blend of claim 1 wherein the aliphatic TPU component comprises a bioabsorbable TPU compound which comprises the reaction product of a (i) polyisocyanate component, (ii) a diol chain extender component, and (iii) optionally a polyol component, wherein at least one of the components (i), (ii), and (iii) contains hydrolyzable units such that the resulting compound contains hydrolyzable units in its backbone;

wherein said diol chain extender component comprises a diol chain extender containing from 1 to 20 carbon atoms; and wherein the weight average molecular weight of said polyol component within said reaction product is from 500 to 20,000.

6. The bioabsorbable polymer blend of claim 5 wherein the degradation rate of said bioabsorbable TPU compound is set by adjusting one or more degradation rate parameters and wherein at least one physical property of said bioabsorbable TPU compound is set by adjusting one or more physical property parameters;

resulting in bioabsorbable polymer blend comprising a bioabsorbable TPU compound where at least one physical property of the bioabsorbable TPU compound, and the degradation rate of the bioabsorbable TPU compound, have been independently set.

7. The bioabsorbable polymer blend of claim 6, wherein the bioabsorbable TPU compound has a degradation rate higher than that of a corresponding base TPU compound where the degradation rate is not adjusted, and wherein the degradation rate of the base TPU compound is adjusted to the higher rate of the bioabsorbable TPU compound, independent of any adjustment of one or more physical properties of the base TPU compound, by at least one of:

(a) increasing the number of bioabsorbable units in the backbone structure of the base TPU compound per unit length of the backbone;

(b) increasing the hydrophilicity of the base TPU compound;

(c) increasing the molecular weight of the polyol-derived component;

(d) decreasing the hard segment content of base TPU compound; and (e) decreasing the crystallinity of the base TPU compound.

8. The bioabsorbable polymer blend of claim 6, wherein the bioabsorbable TPU compound has a degradation rate lower than that of a corresponding base TPU compound where the degradation rate is not adjusted, and wherein the degradation rate of the base TPU compound is adjusted to the lower rate of the bioabsorbable TPU compound, independent of any adjustment of one or more physical properties of the base TPU compound, by at least one of:

(a) decreasing the number of bioabsorbable units in the backbone structure of the base TPU compound per unit length of the backbone;

(b) decreasing the hydrophilicity of the base TPU compound;

(c) decreasing the molecular weight of the polyol-derived component;

(d) increasing the hard segment content of base TPU compound; and (e) increasing the crystallinity of the base TPU compound.

9. The bioabsorbable polymer blend of claim 6, wherein the bioabsorbable TPU compound has a tensile strength higher than that of a corresponding base TPU compound where the tensile strength is not adjusted, and wherein the tensile strength of the base TPU compound is adjusted to the higher tensile strength of the bioabsorbable TPU compound, independent of any adjustment of the degradation rate of the TPU, by at least one of:

(a) increasing the hard segment content of the base TPU compound by altering a ratio of a polyol to a chain extender in the formulation;

(b) increasing the molecular weight of the base TPU compound by varying a stoichiometric ratio of isocyanate to an amount of active hydrogen groups in the TPU compound;

(c) increasing the crystallinity of the polyol-derived component; and (d) increasing the difference in polarity between hard segment components and soft segment components of the base TPU compound.

10. The bioabsorbable polymer blend of claim 6, wherein the bioabsorbable TPU compound has a tensile strength lower than that of a corresponding base TPU compound where the tensile strength is not adjusted, and wherein the tensile strength of the base TPU compound is adjusted to the lower tensile strength of the bioabsorbable TPU compound, independent of any adjustment of the degradation rate of the TPU, by at least one of:

(a) decreasing the hard segment content of the base TPU compound by altering the ratio of a polyol to a chain extender in the formulation;

(b) decreasing the molecular weight of the base TPU compound by varying a stoichiometric ratio of isocyanate to an amount of active hydrogen groups in the thermoplastic polyurethane compound;

(c) decreasing the crystallinity of a polyol-derived component; and (d) decreasing the difference in polarity between hard segment components and soft segment components of the base TPU compound.

11. The bioabsorbable polymer blend of claim 5, wherein the polyisocyanate comprises an aliphatic diisocyanate;
   wherein the polyol is selected from the group consisting of polyester polyols, polyether polyols, and combinations and derivatives thereof.

12. The bioabsorbable polymer blend of claim 11, wherein the polyisocyanate component comprises 1,6-hexane diisocyanate (HDI), 1,4-butane diisocyanate (BDI), L-lysine diisocyanate (LDI), 2,4,4-trimethylhexamethylene-diisocyanate, di-cyclohexyl diisocyanate (H12MDI), or any combination thereof;
   wherein the polyol component comprises polyglycolic acid (PGA), polybutylene adipate, polybutylene succinate, poly-1,3-propylene succinate, polycaprolactone, poly(lactide-co-caprolactone), copolymers of two or more thereof, or any combinations thereof;
   wherein the chain extender component comprises 1,4-butanediol, 2-ethyl-1,3-hexanediol (EHD), 2,2,4-trimethyl pentane-1,3-diol (TMPD), 1,6-hexanediol, 1,4-cyclohexane dimethanol (CHDM), 1,3-propanediol, and combinations thereof.

13. The bioabsorbable polymer blend of claim 11, wherein the polyol component comprises a bioabsorbable unit, where said bioabsorbable unit is derived from glycolic acid, caprolactone, or a combination thereof.

14. A process of making a bioabsorbable polymer blend comprising the step of:
   (I) mixing (i) an aliphatic thermoplastic polyurethane (TPU) component and (ii) a polymer component comprising polyglycolic acid (PGA), a copolymer of polylactic acid (PLA) and PGA, or any combination thereof.

15. A process of making a bioabsorbable polymer blend comprising (i) a polymer component comprising polyglycolic acid (PGA), a copolymer of polylactic acid (PLA) and PGA, or any combination thereof and (ii) a bioabsorbable TPU compound tailored for a medical application, said process comprising the steps of:
   (I) reacting a polyisocyanate component, a diol chain extender component, and optionally a polyol component, wherein at least one of the components contains hydrolyzable units such that the resulting bioabsorbable TPU compound contains hydrolyzable units in its backbone;
   wherein the degradation rate of the compound has been set by adjusting one or more degradation rate parameters and wherein at least one physical property of the compound has been set by adjusting one or more physical property parameters, resulting in a bioabsorbable TPU compound having at least one desired physical property of the compound, and a desired degradation rate of the compound, independently set; and
   (II) mixing (i) the bioabsorbable TPU compound of step (I) and (ii) a polymer component comprising PGA, a copolymer of PLA and PGA, or any combination thereof;
   wherein said diol chain extender component comprises a diol chain extender containing from 1 to 20 carbon atoms; and
   wherein the weight average molecular weight of said polyol component is from 500 to 20,000.

16. The process of claim 15 wherein the degradation rate parameter includes at least one of the following:
   (i) the quantity of bioabsorbable units in the backbone of the overall compound;
   (ii) the molecular weight of the polyol component;
   (iii) the hydrophilicity of the overall compound;
   (iv) the molecular weight of the overall compound;
   (v) the hard segment content of the overall compound; and
   (vi) the crystallinity of the overall compound.

17. The process of claim 15 wherein the physical property includes at least one of the following:
   (a) the tensile strength of the overall compound;
   (b) the hardness of the overall compound;
   (c) the stiffness (flexibility) of the overall compound;
   (d) the resilience of the overall compound;
   (e) the abrasion resistance of the overall compound;
   (f) the water swell of the overall compound;
   (g) the moisture permeability of the compound;
   (h) the impact strength/resistance of the compound;
   (i) the coefficient of friction (on the surface) of the compound;
   (j) the creep of the compound;
   (k) the modulus of elasticity of the compound; and
   (l) the thermal transition points (Tg, Tm) of the compound; and
wherein the physical property parameter includes at least one of the following:
   (i) the hard segment content of the overall compound;
   (ii) the molecular weight the overall compound;
   (iii) the stoichiometry of the overall compound;
   (iv) the molecular weight of a polyol component;
   (v) the hydrophilicity of the overall compound;
   (vi) the difference in polarity between the soft segments and the hard segments of the overall compound;
   (vii) the difference in the degree of hydrogen bonding between the soft segments and hard segments;
   (viii) the molecular weight of the soft segment; and
   (ix) the crystallinity of the overall compound.

18. The process of claim 15 wherein the desired degradation rate is higher than that of a corresponding base TPU compound where the degradation rate is not adjusted, and wherein the adjusting of the degradation rate of said bioabsorbable TPU compound is accomplished, independent of any adjustment of one or more physical properties of the base TPU compound, by at least one of:
   (a) increasing the number of bioabsorbable units in the backbone structure of the base TPU compound per unit length of the backbone;
   (b) increasing the hydrophilicity of the base TPU compound;
   (c) increasing the molecular weight of the polyol-derived component;
   (d) decreasing the hard segment content of base TPU compound; and
   (e) decreasing the crystallinity of the base TPU compound;
   resulting in said bioabsorbable TPU compound with the desired degradation rate.

19. The process of claim 15 wherein the desired degradation rate is lower than that of a corresponding base TPU compound where the degradation rate is not adjusted, and wherein the adjusting of the degradation rate of said bioabsorbable TPU compound is accomplished, independent of any adjustment of one or more physical properties of the base TPU compound, by at least one of:
   (a) decreasing the number of bioabsorbable units in the backbone structure of the base TPU compound per unit length of the backbone;
   (b) decreasing the hydrophilicity of the base TPU compound;
   (c) decreasing the molecular weight of the polyol-derived component;

(d) increasing the hard segment content of base TPU compound; and
(e) increasing the crystallinity of the base TPU compound;
resulting in said bioabsorbable TPU compound with the desired degradation rate.

20. The process of claim 15 wherein the desired tensile strength of said bioabsorbable TPU compound is higher than the tensile strength of a corresponding base TPU compound where the tensile strength is not adjusted, and wherein the adjusting of the tensile strength of said bioabsorbable TPU compound is accomplished, independent of any adjustment of the degradation rate of said bioabsorbable TPU compound, by at least one of:
(a) increasing the hard segment content of the base TPU compound by altering a ratio of a polyol to a chain extender in the formulation;
(b) increasing the molecular weight of the base TPU compound by varying a stoichiometric ratio of isocyanate to an amount of active hydrogen groups in the thermoplastic polyurethane compound;
(c) increasing the crystallinity of the polyol-derived component; and
(d) increasing the difference in polarity between hard segment components and soft segment components of the base TPU compound;
resulting in said bioabsorbable TPU compound with the desired tensile strength.

21. The process of claim 15 wherein the desired tensile strength of said bioabsorbable TPU compound is lower than the tensile strength of a corresponding base TPU compound where the tensile strength is not adjusted, and wherein the adjusting of the tensile strength of said bioabsorbable TPU compound is accomplished, independent of any adjustment of the degradation rate of said bioabsorbable TPU compound, by at least one of:
(a) decreasing the hard segment content of the base TPU compound by altering the ratio of a polyol to a chain extender in the formulation;
(b) decreasing the molecular weight of the base TPU compound by varying a stoichiometric ratio of isocyanate to an amount of active hydrogen groups in the thermoplastic polyurethane compound;
(c) decreasing the crystallinity of a polyol-derived component; and
(d) decreasing the difference in polarity between hard segment components and soft segment components of the base TPU compound;
resulting in said bioabsorbable TPU compound with the desired tensile strength.

22. The process of claim 15 wherein the degradation rate is expressed as a function of at least one of: a change in molecular weight with time; a change in tensile strength with time; and a change in weight of the polymer with time.

23. The process of claim 15 wherein the polyisocyanate comprises an aliphatic diisocyanate;
wherein the polyol is selected from the group consisting of polyester polyols, polyether polyols, and combinations and derivatives thereof;
wherein the chain extender is selected from the group consisting of diols, diamines, and combinations thereof.

24. The process of claim 15 wherein the isocyanate is selected from the group consisting of 4,4'-methylene diphenyl diisocyanate (HMDI), 1,6-hexane diisocyanate (HDI), 1,4-butane diisocyanate (BDI), L-lysine diisocyanate (LDI), 2,4,4-trimethylhexamethylenediisocyanate, di-cyclohexyl diisocyanate (H12MDI), and combinations thereof;
wherein the polyol is selected from the group consisting of polyglycolic acid (PGA), polybutylene adipate, polybutylene succinate, poly-1,3-propylene succinate, polycaprolactone, poly(lactide-co-caprolactone), copolymers of two or more thereof, and mixtures thereof;
wherein the chain extender is selected from the group consisting of 1,4-butanediol, 2-ethyl-1,3-hexanediol (EHD), 2,2,4-trimethyl pentane-1,3-diol (TMPD), 1,6-hexanediol, 1,4-cyclohexane dimethanol (CHDM), 1,3-propanediol, and combinations thereof.

25. The process of claim 15 wherein the hydrolyzable unit of the polyol is derived from lactic acid, glycolic acid, caprolactone, or a combination thereof.

* * * * *